(12) United States Patent
Emmert et al.

(10) Patent No.: US 8,430,079 B2
(45) Date of Patent: Apr. 30, 2013

(54) THROTTLE VALVE

(75) Inventors: Stefan Emmert, Dietenhofen (DE);
Thomas Roessner, Nuremberg (DE);
Christian Preissner, Nuremberg (DE);
Joerg Mayer, Backnang (DE)

(73) Assignee: Robert Bosch GmbH, Stuttgart (DE)

( * ) Notice: Subject to any disclaimer, the term of this patent is extended or adjusted under 35 U.S.C. 154(b) by 543 days.

(21) Appl. No.: 12/679,734

(22) PCT Filed: Nov. 3, 2008

(86) PCT No.: PCT/EP2008/064856
§ 371 (c)(1),
(2), (4) Date: Mar. 24, 2010

(87) PCT Pub. No.: WO2009/071403
PCT Pub. Date: Jun. 11, 2009

(65) Prior Publication Data
US 2010/0206264 A1 Aug. 19, 2010

(30) Foreign Application Priority Data
Dec. 6, 2007 (DE) .......................... 10 2007 058 541

(51) Int. Cl.
*F02D 9/10* (2006.01)
*F16K 1/22* (2006.01)
(52) U.S. Cl.
USPC ........... 123/337; 29/888.4; 251/305; 251/308
(58) Field of Classification Search ................ 123/337; 251/305, 308; 29/888.4
See application file for complete search history.

(56) References Cited

U.S. PATENT DOCUMENTS

| | | | |
|---|---|---|---|
| 2,820,605 A | 1/1958 | Dougherty | |
| 4,010,775 A * | 3/1977 | Roberts | 138/142 |
| 4,079,747 A * | 3/1978 | Roberts | 137/375 |
| 4,176,823 A * | 12/1979 | Gliatas | 251/306 |
| 4,243,203 A | 1/1981 | Mack | |
| 4,682,758 A | 7/1987 | Scobie et al. | |
| 4,783,052 A * | 11/1988 | Walden | 251/368 |
| 5,275,375 A | 1/1994 | Semence | |
| 5,666,988 A | 9/1997 | Becker | |
| 5,672,818 A | 9/1997 | Schaefer et al. | |
| 6,446,934 B2 * | 9/2002 | Bonomi | 251/306 |
| 6,901,942 B2 | 6/2005 | Krimmer et al. | |
| 7,077,383 B1 * | 7/2006 | Dreisilker et al. | 251/305 |
| 7,089,663 B2 * | 8/2006 | Arai et al. | 29/888.4 |
| 7,107,683 B2 * | 9/2006 | Arai et al. | 29/888.4 |

(Continued)

FOREIGN PATENT DOCUMENTS

| | | |
|---|---|---|
| DE | 32 43 996 | 5/1984 |
| DE | 42 20 022 | 12/1993 |

(Continued)

*Primary Examiner* — Erick Solis
(74) *Attorney, Agent, or Firm* — Michael J. Striker

(57) ABSTRACT

A throttle valve for controlling a fluid flow includes a throttle housing (4), a gas passage (18) in the throttle housing (4), a throttle shaft (8) which is pivotably supported in the throttle housing (4), and a throttle (6) which is connected to the throttle shaft (8). The throttle shaft (8) extends through a jacket (12) which is provided on the throttle (6) and at least partially encompasses the throttle shaft (8). After the throttle (6) is installed on the throttle shaft (8), a hardening filler material (10) creates a form-fit connection between the throttle (6) and the throttle shaft (8).

8 Claims, 7 Drawing Sheets

U.S. PATENT DOCUMENTS

| | | | |
|---|---|---|---|
| 7,219,652 B2 * | 5/2007 | Ino et al. | 123/337 |
| 7,264,221 B2 * | 9/2007 | Yeary et al. | 251/127 |
| 7,328,507 B2 * | 2/2008 | Arai et al. | 29/888.4 |
| 7,770,557 B2 * | 8/2010 | Ikeda et al. | 123/337 |
| 7,895,988 B2 * | 3/2011 | Lancioni et al. | 123/337 |
| 8,052,118 B2 * | 11/2011 | Sano | 251/308 |
| 2001/0003357 A1 * | 6/2001 | Bonomi | 251/305 |
| 2005/0189513 A1 * | 9/2005 | Ino et al. | 251/308 |
| 2006/0163516 A1 * | 7/2006 | Dreisilker et al. | 251/305 |

FOREIGN PATENT DOCUMENTS

| | | |
|---|---|---|
| DE | 43 43 091 | 6/1995 |
| DE | 195 25 510 | 1/1997 |
| DE | 98/34020 | 8/1998 |
| DE | 197 03 296 | 8/1998 |
| DE | 198 20 080 | 11/1999 |
| DE | 198 41 181 | 3/2000 |
| DE | 102 26 594 | 1/2004 |
| EP | 0 575 235 | 12/1993 |
| EP | 1 128 040 | 8/2001 |
| EP | 0 879 136 | 11/2001 |
| EP | 1 394 453 | 3/2004 |
| GB | 2 131 918 | 6/1984 |
| JP | 2005337198 | 12/2005 |
| JP | 2007032285 | 2/2007 |

* cited by examiner

THROTTLE VALVE

CROSS-REFERENCE

The invention described and claimed hereinbelow is also described in PCT/EP2008/064856, filed on Nov. 3, 2008 and DE 10 2007 058 541.3, filed on Dec.6, 2007. This German Patent Application, whose subject matter is incorporated here by reference, provides the basis for a claim of priority of invention under 35 U.S.C. 119 (a)-(d).

BACKGROUND OF THE INVENTION

In motor vehicles that include an internal combustion engine, there is usually at least one throttle valve which is used to control a fluid flow, in particular to control a flow of intake air which is supplied to the internal combustion engine. Throttle valves may be used to control the performance of the internal combustion engine.

A throttle shaft is pivotably supported in the throttle valve. A throttle is fastened to the throttle shaft. In the throttle valve shown in DE 42 20 022 A1, the throttle shaft includes a slot in which the throttle is fastened using screws. Measures are described in DE 42 20 022 A1 for reducing the leakage caused by the slot in the throttle shaft to the greatest extent possible.

With regard to throttle valves, it is important that the throttle be positioned very precisely inside the gas passage. Due to this problem, U.S. Pat. No. 4,682,758 shows an embodiment in which the throttle may be adjusted, using screws, in a direction transverse to the throttle shaft.

EP 0 879 136 B1 provides a throttle valve in which the throttle shaft includes projections which may be used to rivet the throttle to the throttle shaft.

DE 43 43 091 A1 shows a throttle valve in which a throttle is integrally extruded onto a throttle shaft which is pivotably supported in a throttle housing.

According to DE 197 03 296 A1, a thermosetting sealing means is applied in the liquid state using a cannula to a recess located between the throttle shaft and the throttle housing. Once hardened, the sealing means at the pivot bearing point creates a seal between the throttle shaft and the throttle housing.

According to DE 32 43 996 C1, a polymer coating is applied to the wall of the gas passage of the throttle valve. The polymer coating is used to reduce the leakage air when the throttle is in the closed position. The polymer coating on the wall of the gas passage creates unevenness, thereby causing an undesired turbulence in the fluid that is flowing through the gas passage.

DE 198 461 181 A1 shows a throttle valve in which the throttle housing includes transverse holes through which shaft stubs are shaped, from both sides, in the material of the throttle. The shaft stubs are preferably shaped in the material of the throttle via ultrasound. This method may only be used when the throttle is composed of a material that allows the shaft stubs to be shaped. Using the method shown in DE 198 41 181 A1, it is possible to position the throttle very precisely relative to the gas passage, but this method is rather elaborate.

U.S. Pat. No. 4,243,203 shows a throttle valve which includes a throttle shaft that is pivotably supported in a throttle housing, and which extends through a jacket that is integrally formed on the throttle. Screws are used to prevent the throttle from rotating.

SUMMARY OF THE INVENTION

The throttle valve according to the present invention, and the method, according to the present invention, for manufacturing a throttle valve have the advantages that the effort required to adjust the throttle relative to the throttle housing is considerably reduced, and that, in the closed position, it is possible to reduce leakage between the throttle and the gas passage to a particularly small amount, and that leakage between the throttle and the throttle shaft may be entirely prevented. A further advantage is that the exact positioning between the throttle and the inner wall of the gas passage is permanently ensured. A further advantage is the permanent mechanical connection between the throttle and the throttle shaft. Advantageously, practically all of the materials that have been used for throttles and throttle shafts may continue to be used for the throttle and the throttle shaft.

Due to the measures listed in the dependent claims, advantageous developments and improvements of the throttle valve and the method for manufacturing a throttle valve are made possible.

The intermediate space between the throttle shaft and the jacket of the throttle, which at least partially encloses the throttle shaft, provides the advantage that a sufficient amount of filler material may be applied, thereby ensuring a particularly good, permanent positioning of the throttle relative to the throttle shaft. When the intermediate space is sized accordingly, the throttle may even be easily oriented transversely to the throttle shaft for adjustment purposes, before the filler material hardens.

The out-of-roundness of the jacket surface that faces the throttle shaft and/or the filler material, and the at least one irregularity on the jacket surface—which faces the throttle shaft or the filler material—of the throttle jacket that accommodates the throttle shaft provide the advantage of a permanent, more secure, fixed connection. The throttle is permanently prevented from rotating relative to the throttle shaft. The same advantages are offered by the out-of-roundness of the throttle shaft or the at least one irregularity on the throttle shaft in the region of the jacket.

If the filler material is applied to the intermediate space between the throttle shaft and the throttle after the throttle has been installed on the throttle shaft, the advantage is attained that the throttle valve is manufactured using a logical sequence of steps, and it is possible to determine exactly when, how, and where the filler material should be applied.

If the hardening filler material is applied after assembly, but before installation on the throttle shaft and/or throttle, this results in the advantage of efficient manufacturing using few working steps.

The throttle valve that includes at least one impressed region on the jacket of the throttle offers the advantage of providing an easily manufactured, more torque-resistant, and permanent connection between the throttle and the throttle shaft, which offers the advantage that the throttle may easily be positioned precisely and reliably relative to the throttle shaft. A further advantage is the fact that there is no need to apply liquid or pasty material.

BRIEF DESCRIPTION OF THE DRAWINGS

Preferably selected, particularly advantageous embodiments of the present invention are presented in the drawings in a simplified manner, and are described in greater detail in the description that follows.

DETAILED DESCRIPTION OF THE PREFERRED EMBODIMENTS

Figure 1:
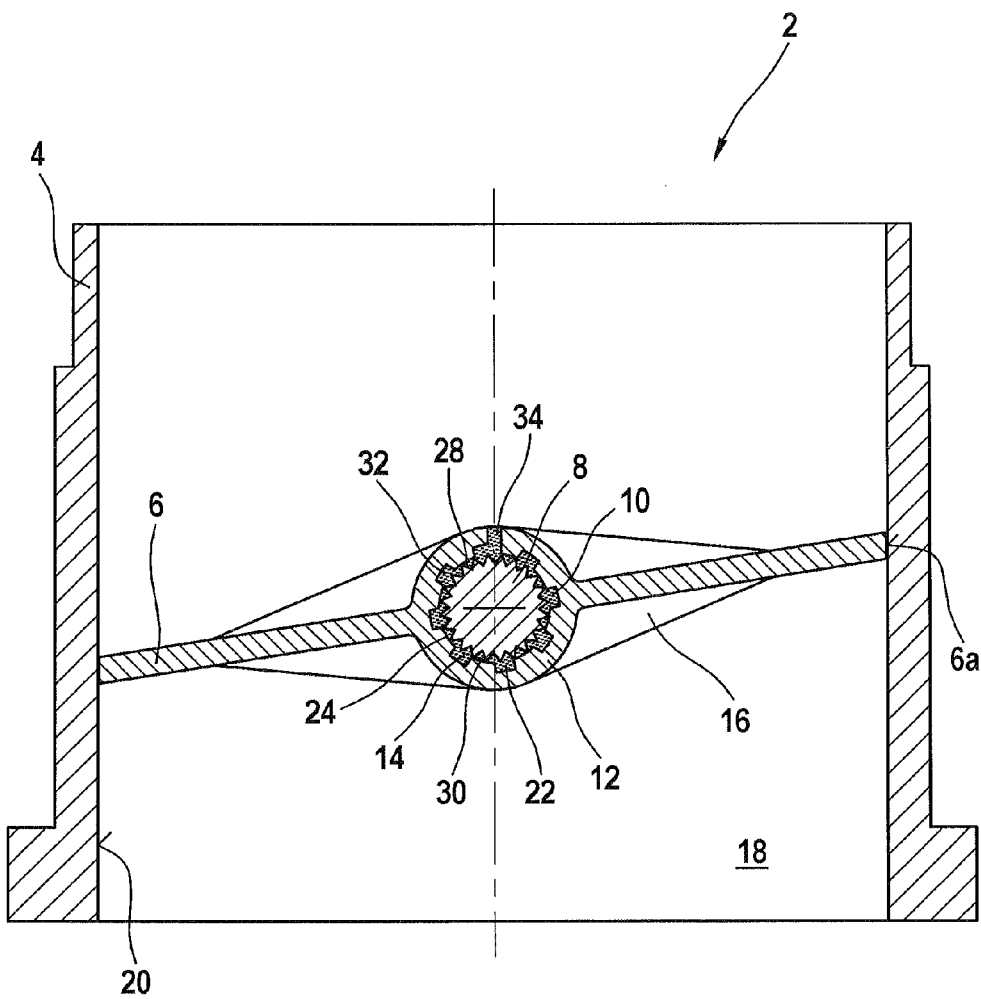
FIG. 1 shows a throttle valve.

FIG. 1 shows a preferably selected, particularly advantageous embodiment of a throttle valve 2 which includes a throttle housing 4, a throttle 6, and a throttle shaft 8. Throttle shaft 8 is pivotably supported on both sides in throttle housing 4 via two bearings which are not depicted. Throttle shaft 8 may also be supported in throttle housing 4 on only one side via a not-shown bearing. A filler material 10 or fixing material 10 is provided between throttle 6 and throttle shaft 8. In FIG. 1, the surfaces in which filler material 10 or fixing material 10 or adhesive 10 is located are indicated symbolically using dots.

Throttle valve 2 controls a fluid flow, in particular to control the intake air which is supplied to a not-shown internal combustion engine, to control an exhaust flow, or to control the return of a portion of the exhaust gas to the internal combustion engine. Throttle valve 2 may be used, e.g., to control the output of the internal combustion engine. It is not uncommon for one internal combustion engine to utilize a plurality of throttle valves. When throttle valve 2 is used in particular to control the flow of intake air, throttle valve 2 is often referred to as a throttle body or a throttle control device.

Throttle 6 includes an integrally extruded jacket 12 which is designed as a thickened region. Jacket 12 preferably extends across the entire diameter of throttle 6. It is also possible to not extend the thickened region and, therefore, jacket 12, across the entire diameter of throttle 6. A continuous receiving opening 14 extends through jacket 12. Jacket 12 encloses receiving opening 14. A reinforcement rib 16 or a plurality of reinforcement ribs 16 may be provided on throttle 6. Throttle 6 has circumference 6*a*.

A gas passage 18 extends through throttle housing 4. An inner wall 20 of throttle housing 4 encloses gas passage 18.

The size of throttle 6 is adapted to the cross section of gas passage 18. If gas passage 18 has a circular cross section, for instance, then throttle 6 is, e.g., slightly oval, and so, when throttle 6 is in the closed position, i.e., when entire circumference 6*a* bears against inner wall 20, then throttle 6 is positioned slightly at an angle, as shown in FIG. 1.

Throttle shaft 8 is located in receiving opening 14 of throttle 6. Throttle shaft 8 extends beyond circumference 6*a* of throttle 6 on two sides or on only one side, depending on the type of support of throttle 6.

Throttle shaft 8 has an outer diameter in the region of jacket 12 that is sized such that an intermediate space 22 exists between throttle shaft 8 and jacket 12. Intermediate space 22, at least a portion of intermediate space 22, and preferably a major part of intermediate space 22 is filled with filler material 10. Receiving opening 14 in jacket 12 of throttle 6 includes a jacket surface 24 that faces throttle shaft 8 and filler material 10. Throttle shaft 8 includes, in the region inside jacket 12, a circumferential surface 28 that faces jacket 12 and filler material 10.

Circumferential surface 28 includes irregularities 30 in the region of the fastening between throttle shaft 8 and throttle 6. Irregularities 30 are, e.g., teeth that are situated on circumferential surface 28, and/or axially parallel shafts that are located on circumferential surface 28, and/or radially extending holes in throttle shaft 8.

Jacket surface 24 of jacket 12 of throttle 6 includes irregularities 32 in the region of the fastening between throttle shaft 8 and throttle 6. Irregularities 32 on inner jacket surface 24 of jacket 12 are, e.g., projecting teeth and/or abrupt recesses, and/or ridges that are distributed around the circumference in an axially parallel manner, and/or radial holes in jacket surface 24.

An injection opening 34 is located in jacket 12 of throttle 6. Injection opening 34 extends inwardly from the surface of jacket 12, until injection opening 34 exits at inner jacket surface 24. Filler material 10 or fixing material 10 may be injected through injection opening 34 into intermediate space 22 between throttle shaft 8 and throttle 6. Filler material 10 or fixing material 10 hardens shortly after it is injected, thereby preventing any radial movement from occurring between throttle 6 and throttle shaft 8.

The at least one irregularity 30 on circumferential surface 28 of throttle shaft 8, and the at least one irregularity 32 on inner jacket surface 24 of jacket 12 of throttle 6 ensure that there is an absolutely fixed, and, in particular, and absolutely non-rotatable connection between throttle 6 and throttle shaft 8. Due to the at least one irregularity 30 on throttle shaft 8, it is not absolutely necessary for filler material 10 or fixing material 10 to bond or adhere to throttle shaft 8. It is therefore possible to use the most suitable materials for throttle 6 and throttle shaft 8 without having to make allowances for filler material 10 or fixing material 10. In addition, filler material 10 and/or fixing material 10 may be selected practically independently of the materials used to create throttle 6 and throttle shaft 8.

Ferrous metals, non-ferrous metals, or plastics, e.g., thermosetting compositions, or thermoplastics, may be used as the material for throttle shaft 8. The same applies for throttle 6. Filler material 10 or fixing material 10 may be a plastic, an elastomer, a plastic-based adhesive, a metal-based adhesive, or a liquified metal similar to solder.

The following procedure, which is composed of the working steps described below, is provided for the manufacture of throttle valve 2:

First, throttle 6 is placed in gas passage 18. Next, throttle shaft 8 is inserted through the bearing which is present in throttle housing 4 but is not depicted, and through receiving opening 14 in throttle 6. Finally, throttle 6 is positioned exactly. The exact positioning of throttle 6 may preferably be attained by placing circumference 6*a* of throttle 6 against inner wall 20 of gas passage 18. Throttle shaft 8 is also positioned exactly, as viewed in its swiveling direction. A drive wheel or gear wheel, which is not shown, or a lever, which is not shown, is typically located on throttle shaft 8 outside of gas passage 18. Due to the high requirements placed on throttle valve 2, it is usually important for this wheel or lever to be positioned exactly relative to throttle 6, as viewed in the swiveling direction.

Once throttle 6 and throttle shaft 8 have been positioned exactly, filler material 10 is injected via injection opening 34 into intermediate space 22 between throttle shaft 8 and jacket 12 of throttle 6. After a brief period of time, filler material 10 or fixing material 10 hardens, either via a chemical reaction, and/or due to cooling. Due to irregularities 30 and 32, any relative rotational motion between throttle shaft 10 and throttle 6 is prevented once filler material 10 has hardened. Filler material 10 ensures that the positioning between the drive wheel or gear wheel or lever outside of gas passage 18, and throttle 6 inside gas passage 18 is easy to attain, and is permanent and exact.

Via the proper dimensioning of the pressure at which filler material 10 is injected, it is also possible to compensate for shrinkage in filler material 10, thereby ensuring that intermediate space 22 is filled permanently and nearly completely with filler material 10. Hardened filler material 10 also closes the at least one injection opening 34.

Figure 2:
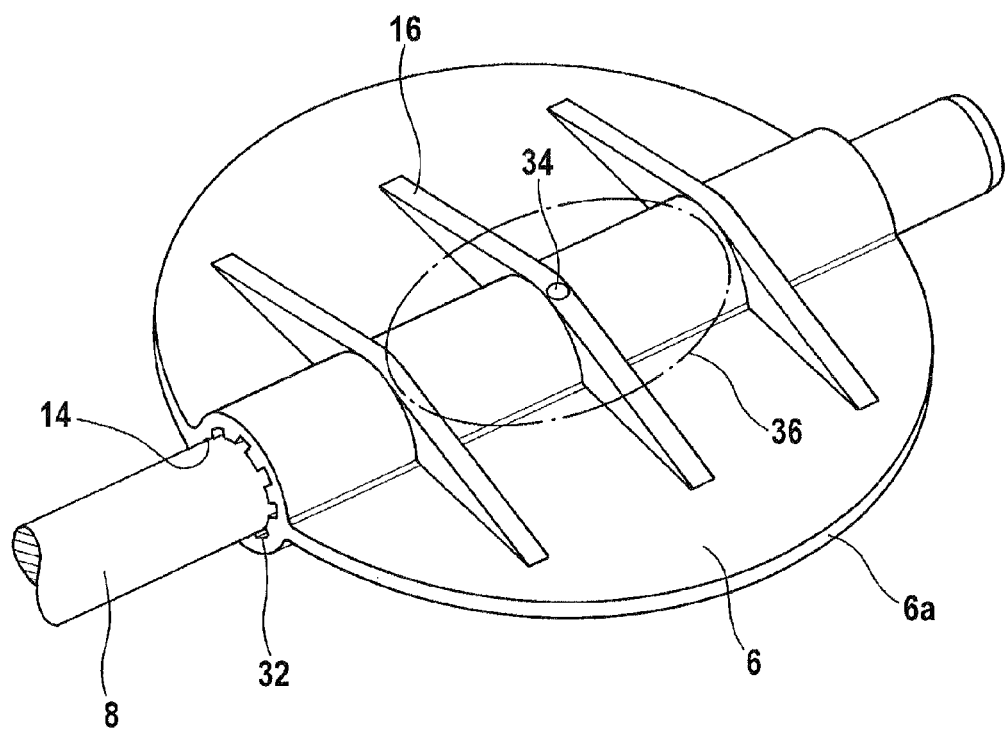
FIGS. 2 and 3 show a throttle shaft, including a throttle.

FIG. 2 shows an oblique view of throttle 6, including throttle shaft 8 which extends through receiving opening 14 in throttle 6. Throttle housing 4 is not depicted in FIG. 2, to ensure clarity.

Parts that are the same or similar-acting are labelled using the same reference numerals in all of the figures. Unless mentioned otherwise or depicted otherwise in the drawings, the descriptions that are mentioned or depicted via the figures also apply to the other embodiments. Unless stated otherwise in the explanations, the details of the various embodiments may be combined with one another.

Injection opening 34 is located approximately in the center of throttle 6. After filler material 10 has been injected through injection opening 34, filler material 10 spreads in intermediate space 22. The region in which filler material 10 spreads is indicated in FIG. 2 using a dot-dashed oval. Filler material 10 or fixing material 10 creates a form-fit region 36 between throttle 6 and throttle shaft 8. The oval, which is indicated using a dot-dashed line, roughly marks form-fit region 36.

Figure 3:
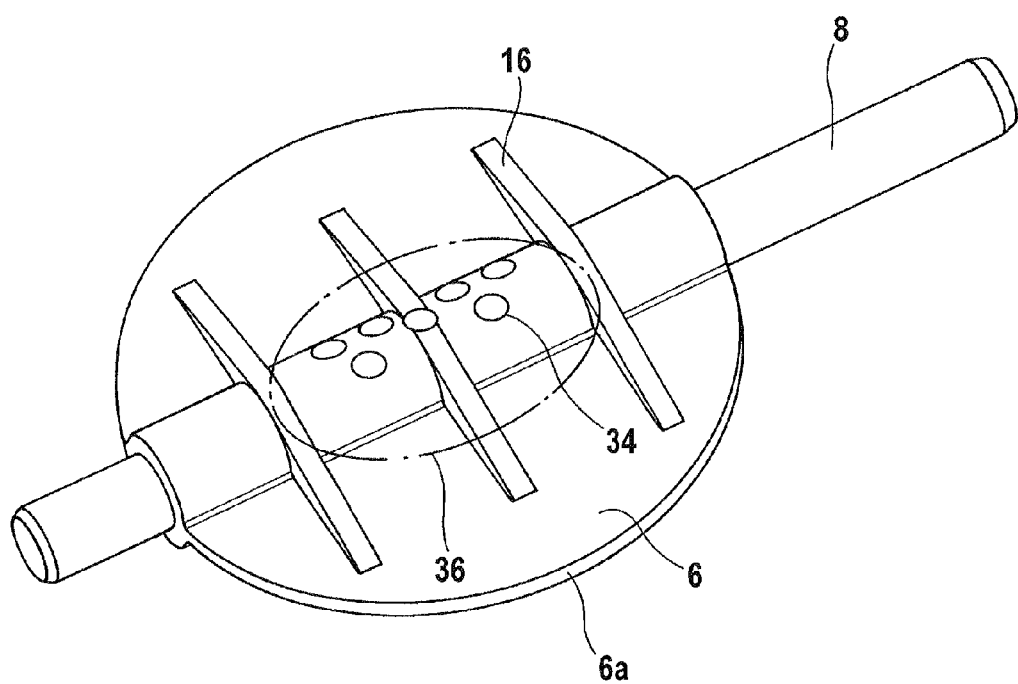

Similar to FIG. 2, FIG. 3 also shows throttle 6 and throttle shaft 8. In the embodiment shown in FIG. 3, there are seven injection openings 34 in jacket 12. It should be mentioned that the number of injection openings 34 may be selected depending on the property of filler material 10 used. If a plurality of injection openings 34 is provided, then filler material 10 may be injected through all injection openings 34 simultaneously, thereby ensuring that intermediate space 22 between throttle 6 and throttle shaft 8 may be filled precisely, even though filler material 10 hardens quickly.

Figure 4:
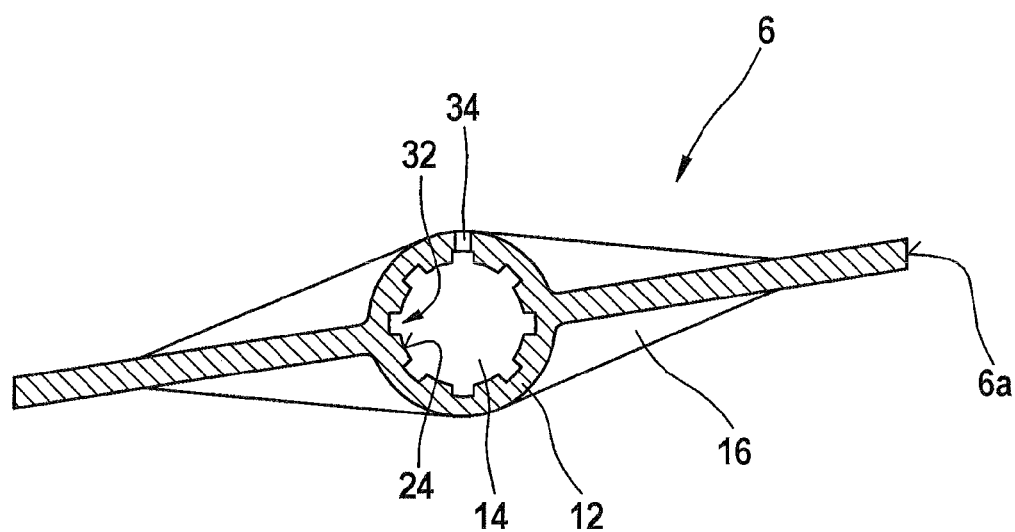
FIGS. 4, 5, 6 show details of the throttle valve.

FIG. 4 shows only throttle 6. FIG. 4 shows a cross section through throttle 6 transversely to jacket 12 and transversely to receiving opening 14. Shown clearly are irregularities 32, which are distributed around the circumference, on jacket surface 24, which faces throttle shaft 8, of jacket 12 of throttle 6.

Figure 5:
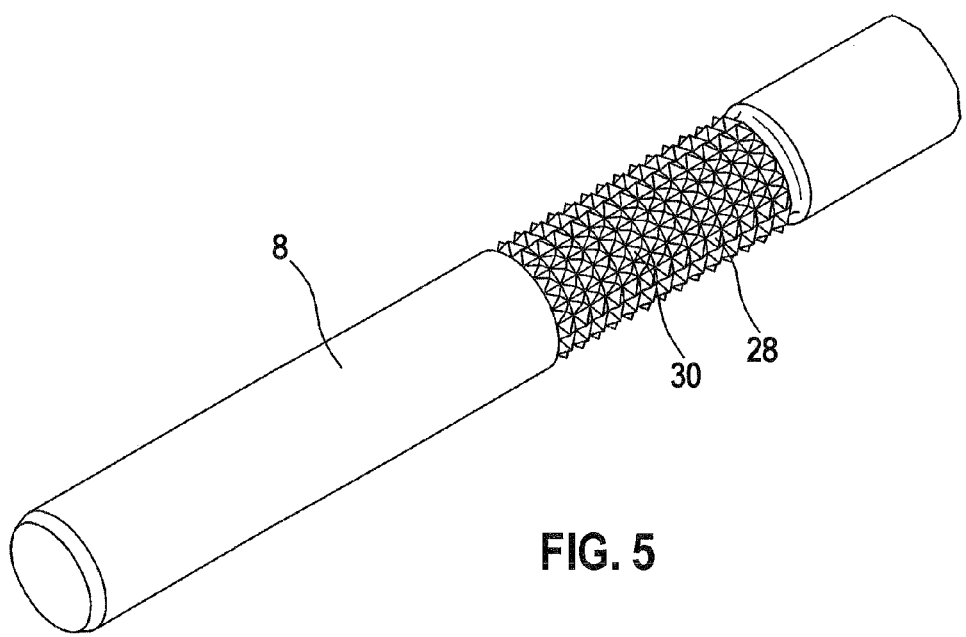
Figure 6:
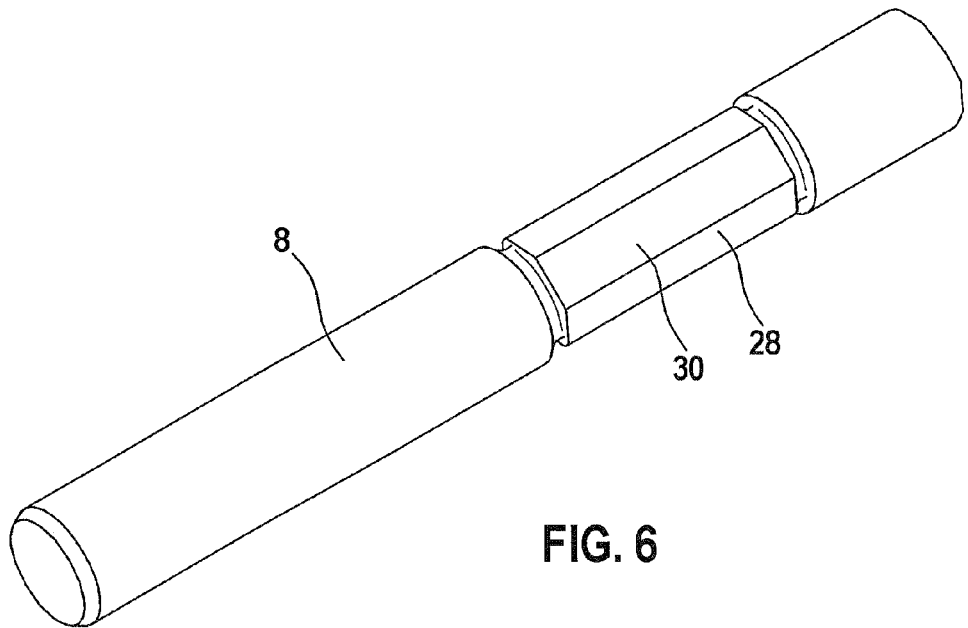

FIGS. 5 and 6 show only throttle shaft 8, including differently-shaped circumferential surfaces 28, including irregularities 30, onto which filler material 10 may cling after assembly. In FIG. 5, irregularities 30 on circumferential surface 28 are depicted in the shape of pressed-in, prismatic teeth. FIG. 6 shows irregularities 30, with the aid of which filler material 10 forms a non-rotatable, form-fit connection, in the form of a polygon, e.g., a hexagon or an octagon.

Figure 7:
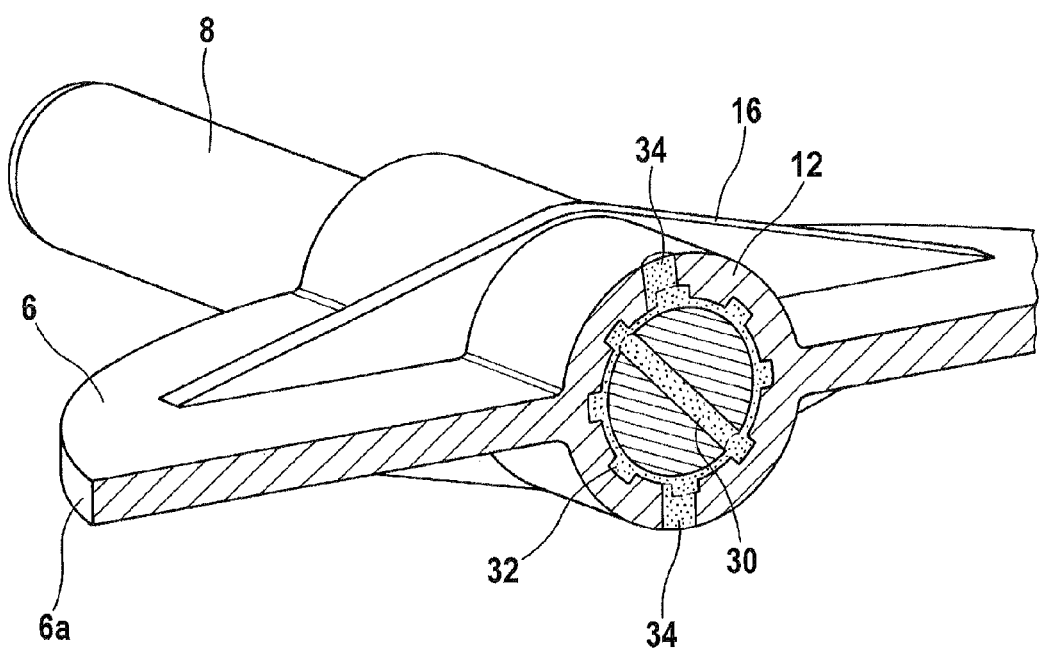
FIG. 7 shows a modified embodiment.

FIG. 7 shows a cross-sectional view of throttle shaft 8 and through jacket 12 of throttle 6. FIG. 7 shows a somewhat modified embodiment.

In the embodiment shown in FIG. 7, there is at least one injection opening 34 that extends from the top side, and at least one injection opening 34 that extends from the bottom side. As a result, it is better ensured that intermediate space 22 is filled as completely as possible by filler material 10.

In the design shown in FIG. 7, there is at least one bore hole that extends transversely through throttle shaft 8 in form-fit region 36. When filler material 10 is injected into intermediate space 22, filler material 10 also enters this bore hole. This bore hole therefore functions as irregularity 30 in throttle shaft 8, in order to attain a torque-proof connection between throttle shaft 8 and throttle 6.

As described above with reference to the embodiments, the sequence of steps is to first assemble throttle shaft 8 and throttle 6, to orient throttle shaft 8 and throttle 6, to apply filler material 10, and, finally, to wait until filler material 10 has hardened. In an alternative embodiment, or according to an alternative procedure, filler material 10 is packaged in microcapsules. Before throttle 6 is installed on throttle shaft 8, the microcapsules are applied to circumferential surface 28 of throttle shaft 8 and/or to jacket surface 24 of throttle 6. When throttle shaft 8 is joined to throttle 6, the microcapsules are squeezed and destroyed. Filler material 10 is expelled and fills intermediate space 22 between throttle 6 and throttle shaft 8 in form-fit region 36. The next step is to wait until filler material 10 has hardened. In this case as well, receiving opening 14, in which throttle shaft 8 is located, must be large enough for intermediate space 22 to be large enough in order to orient throttle 6 transversely to the pivot axis relative to throttle shaft 8.

Figure 8:
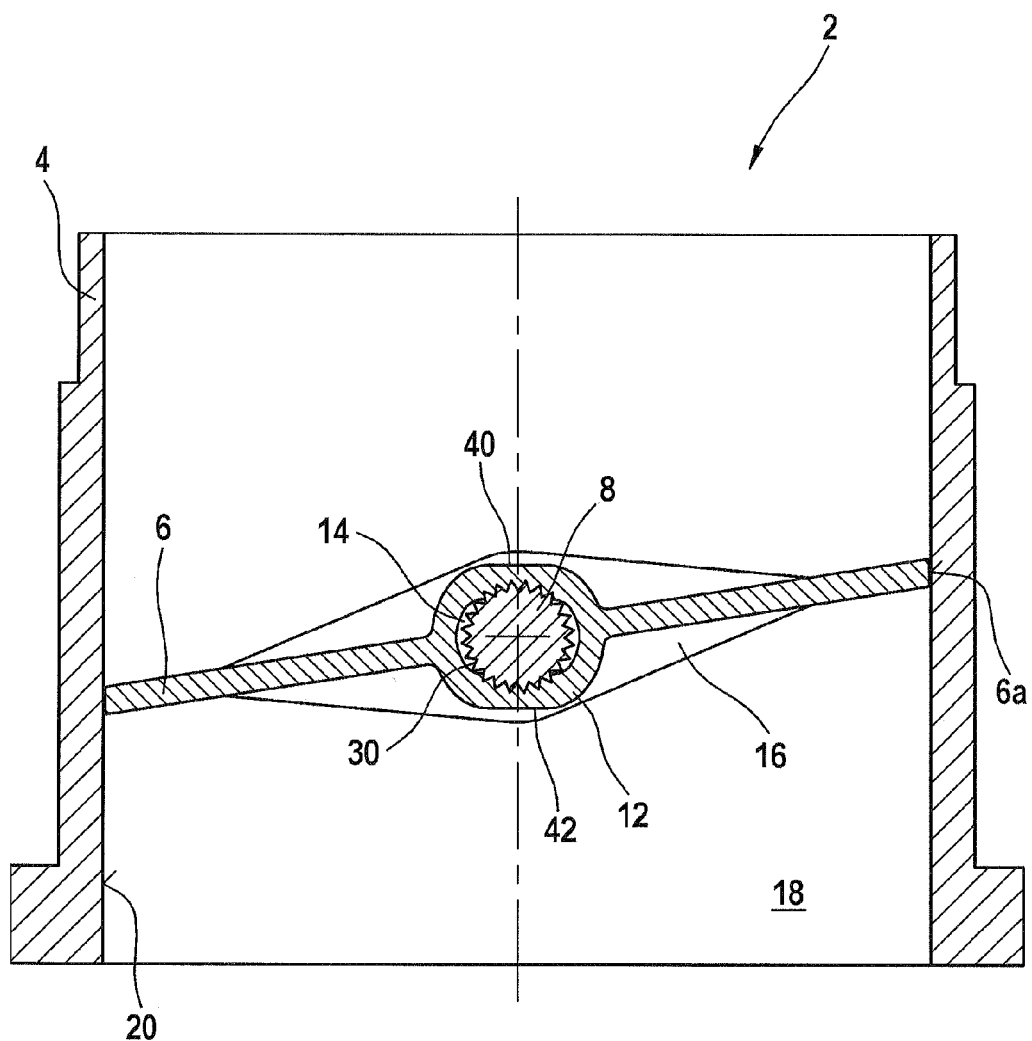
FIG. 8 shows a further embodiment of the throttle valve.

FIG. 8 shows a further embodiment of a throttle valve 2 according to the present invention.

In the embodiment shown in FIG. 8, there is at least one impressed region 40 on jacket 12 of throttle 6. It is proposed that a further impressed region 42 or a plurality of impressed regions be provided in addition to impressed region 40.

The following method is provided for manufacturing throttle valve 2 which is depicted in FIG. 8: After throttle 6 is inserted in gas passage 18, throttle shaft 8 is installed in the not-shown bearing in throttle housing 4, and in receiving opening 14 in throttle 6. Next, throttle 6 and throttle shaft 8 are positioned exactly, thereby ensuring that throttle 6 is positioned precisely also relative to throttle shaft 8. After this positioning has been carried out, throttle 6 is impressed on the circumference of jacket 12 of throttle 6, from above and from below, using a die, and so jacket 6 is plastically deformed in the impressed region. Via this plastic deformation of jacket 12, jacket surface 24 is pressed into irregularities 30 provided on throttle shaft 8. In this manner, a torque-proof, permanent fixation between throttle 6 and throttle shaft 8 is attained.

What is claimed is:

1. A throttle valve for controlling a fluid flow, comprising:
a throttle housing (4); a gas passage (18) in the throttle housing (4);
a throttle shaft (8) which is pivotably supported in the throttle housing (4); and
a throttle (6) which is connected to the throttle shaft (8), in which the throttle shaft (8) extends through a jacket (12) which is provided on the throttle (6) and at least partially encompasses the throttle shaft (8),
wherein, after the throttle (6) is installed on the throttle shaft (8), a hardening filler material (10) creates a form-fit connection between the throttle (6) and the throttle shaft (8), and wherein the filler material (10) is applied between the throttle (6) and the throttle shaft (8) after the throttle (6) is installed on the throttle shaft (8).

2. The throttle valve as recited in claim 1, wherein an intermediate space (22) exists between the throttle shaft (8) and the jacket (12), in which the filler material (10) is located.

3. The throttle valve as recited in claim 1, wherein the jacket (12) includes at least one irregularity (30) on its jacket surface (24) that faces the filler material (10).

4. The throttle valve as recited in claim 1, wherein the throttle shaft (8) includes at least one irregularity (32) that faces the filler material (10).

5. The throttle valve as recited in claim 1, wherein at least a portion of the filler material (10) was applied to the throttle (6) and/or the throttle shaft (8) after the throttle (6) was installed on the throttle shaft (8).

6. A method for manufacturing a throttle valve which is used to control a fluid flow, comprising a throttle housing (4), a gas passage (18) in the throttle housing (4), a throttle shaft (8) which is pivotably supported in the throttle housing (4), and a throttle (6) which is connected to the throttle shaft (8), in which the throttle shaft (8) extends through a jacket (12) which is provided on the throttle (6) and at least partially encompasses the throttle shaft (8),
wherein, after the throttle (6) is installed on the throttle shaft (8), a filler material (10) provided between the throttle (6) and the throttle shaft (8) hardens.

7. The method for manufacturing a throttle valve, as recited in claim 6, wherein the filler material (10) is applied between the throttle shaft (8) and the jacket (12) after the throttle (6) is installed on the throttle shaft (8).

8. A throttle valve for controlling a fluid flow, comprising a throttle housing (4), a gas passage (18) in the throttle housing (4), a throttle shaft (8) which is pivotably supported in the throttle housing (4), and a throttle (6) which is connected to the throttle shaft (8), in which the throttle shaft (8) extends through a jacket (12) which is provided on the throttle (6) and at least partially encompasses the throttle shaft (8), wherein at least one impressed region (40, 42) on the jacket (12) is used to create a form-fit connection between the throttle shaft (8) and the throttle (6).

* * * * *